United States Patent
Bodor et al.

(10) Patent No.: US 6,878,394 B2
(45) Date of Patent: Apr. 12, 2005

(54) EGG REPLACER CONCENTRATE AND LIQUID EGG REPLACER

(75) Inventors: Janos Bodor, Vlaardingen (NL); Ivo Antonius Van Amerongen, Vlaardingen (NL); Gerardus Antonius Matthijssen, Vlaardingen (NL)

(73) Assignee: Conopco, Inc., Edgewater, NJ (US)

( * ) Notice: Subject to any disclaimer, the term of this patent is extended or adjusted under 35 U.S.C. 154(b) by 0 days.

(21) Appl. No.: 10/738,175

(22) Filed: Dec. 17, 2003

(65) Prior Publication Data

US 2004/0166230 A1 Aug. 26, 2004

(30) Foreign Application Priority Data

Feb. 21, 2003 (EP) ............................................. 03075500

(51) Int. Cl.$^7$ ................................................. A23L 1/20
(52) U.S. Cl. ........................ 426/656; 426/614; 426/634
(58) Field of Search ................................ 426/634, 614, 426/656

(56) References Cited

U.S. PATENT DOCUMENTS

| | | | | |
|---|---|---|---|---|
| 4,360,537 A | * | 11/1982 | Tan et al. .................. | 426/656 |
| 4,511,588 A | * | 4/1985 | Kudo et al. .................. | 426/302 |
| 5,192,566 A | * | 3/1993 | Cox et al. ..................... | 428/89 |
| 5,340,601 A | * | 8/1994 | Vassiliou ..................... | 426/614 |
| 6,726,951 B2 | * | 4/2004 | Campbell et al. ........... | 426/614 |

OTHER PUBLICATIONS

*International Search Report no. PCT/EP 2004/001180 dated May 11, 2004—3 pp..*

* cited by examiner

Primary Examiner—Anthony Weier
(74) Attorney, Agent, or Firm—Ellen Plotkin

(57) ABSTRACT

An egg replacer concentrate is provided that has a low cholesterol content. It includes 40–85% protein, 10–50% vegetable oil and 0.5–15% carbohydrate. The cholesterol content is less than 0.5%. The protein includes soy protein, milk protein and optionally egg white protein, at least half of the protein being soy protein. The PDI is at least 60%. The concentrate is dispersed in water, and optionally egg whites, to provide a liquid egg replacer. The liquid egg replacer includes egg white protein and has a moisture content of 75–84%. It contains 16–28% of the egg replacer concentrate, 45–82% water and optionally egg white.

26 Claims, No Drawings

EGG REPLACER CONCENTRATE AND LIQUID EGG REPLACER

The invention relates to an egg replacer concentrate and to a liquid egg replacer that have a low cholesterol content.

Egg is a versatile food and food component. However, its cholesterol content causes concern. In addition, there are health issues regarding its saturated fatty acid content and the risk of salmonella contamination. To address such issues many compositions have been proposed to replace eggs.

U.S. Pat. No. 4,103,038 discloses an egg replacer composition based on ultrafiltration whey protein, fats and emulsifier.

U.S. Pat. No. 4,120,986 describes the preparation of a high protein content material that contains 25–55% protein, 5–15% fat and 25–50% carbohydrate, which is then further processed with emulsifier, lecithin, pregelatinized starch and gum to provide an egg replacer.

U.S. Pat. No. 4,296,134 describes a liquid egg blend which contains less than 1.25 wt % fat and which comprises 60–96 pbw egg whites, 0–18 pbw water, 2–10.5 pbw protein replacement and small amounts of stabilizer, flavoring and coloring.

U.S. Pat. No. 4,360,537 discloses the preparation of a lipoprotein emulsion system based on soy isolate that can be used to replace egg yolk in various food products. In the preparation high amounts of soluble carbohydrates are included.

U.S. Pat. No. 5,725,899 describes the preparation of a composition from soy flour and soy oil which on reconstitution in water forms a milk-like protein beverage.

JP 53 032 161 describes a method to prepare a cholesterol free egg composition that includes 70–95.5 wt % egg white, 0.005–0.3 wt % xanthan gum, 0.04–0.2 wt % carboxymethylcellulose, 0.04–0.2 wt % guar gum, 3–8 wt % defatted milk solids, 9–13 wt % vegetable oil and 0.25–0.35 wt % lecithin.

Despite the intensive efforts, the egg replacer products have not been as successful as anticipated. A problem that remains in particular is that in use, the rheological properties deviate substantially from those of eggs. A cook using an egg replacer product, e.g. to prepare scrambled eggs or omelets, expects that the liquid egg replacer composition is fairly thin and remains so over an extended period of time before cooking. During cooking, coagulation is expected to happen. The prepared product should have a consistency, when served and when eaten, that is perceived to be similar to that of the corresponding product prepared from whole eggs.

Other problems arise because often the preparation of a proposed egg replacer product requires complicated processing, sometimes requiring expensive equipment, and/or the use of ingredients that are not readily available or expensive. There are also problems with off-tastes from certain ingredients or processing steps.

We have now found an egg replacer that has improved rheological properties. It is easy to prepare from readily available materials.

Surprisingly, we have found that our egg replacer results in consumable product that may retain its freshness for longer than the comparable product prepared from real eggs. For example, omelets or scrambled eggs from real egg can become tough and have a deteriorated mouthfeel if kept for e.g. a few hours before consumption. We have found that for example omelets and scrambled eggs prepared with our egg replacer can retain good mouthfeel properties for longer.

The present invention provides an egg replacer concentrate that comprises 40–85 wt % protein, 10–50 wt % vegetable oil, 0.5–15 wt % carbohydrate and less than 0.5 wt % cholesterol, wherein the protein comprises soy protein, milk protein and optionally egg white protein, wherein at least 50 wt % of the protein is soy protein and wherein the PDI is at least 60%.

The egg replacer concentrate is a composition that can be dispersed in water to provide a liquid egg replacer that can be used to prepare e.g. scrambled eggs or omelets. It can also be used in other recipes to replace whole eggs or egg yolk, e.g. to prepare mayonnaise, cake or custard.

The egg replacer concentrate may, but need not, contain egg white protein. In preparing the liquid egg replacer with the present concentrate egg white, e.g. fresh or frozen, may be included. The present invention is particularly concerned with replacing whole eggs. Therefore, if in the preparation of the liquid egg replacer, egg white is to be included, the egg replacer concentrate need not contain egg white protein. However, if egg white is not to be included in the preparation of the liquid egg replacer then preferably the egg replacer concentrate to be used does include egg white protein. The presence of egg white protein in the liquid egg replacer contributes to obtaining the desired rheological properties.

Accordingly, the present invention also provides a liquid egg replacer that comprises 16–28 wt % of the present egg replacer concentrate, 45–82 wt % water and optionally egg white, wherein the moisture content of the liquid egg replacer is 75–84 wt % and the liquid egg replacer comprises egg white protein. If egg white is included in the preparation of the liquid egg replacer, then it is preferably used in an amount of 20–40 wt %, more preferably 25–35 wt % of the liquid egg replacer.

Preferably the egg replacer concentrate includes egg white protein. The liquid egg replacer is preferably prepared using an egg replacer concentrate that includes egg white protein and without including egg white in addition to the egg white protein in the egg replacer concentrate. In such case preferably the amount of water included in the liquid egg replacer is 70–82 wt % and the amount of egg replacer concentrate is 18–30 wt %.

The amount and composition of protein is a key aspect of the present invention. To obtain good rheological properties the overall protein content should be relatively high, the protein should comprise soy protein and milk protein, at least half of the protein being soy protein. The liquid egg replacer should also include egg white protein. If the egg replacer concentrate does not include egg white protein then preferably at least 60 wt %, more preferably 80–98 wt % of the protein is soy protein.

The protein materials employed to provide the protein for the egg replacer concentrate should contain protein that has retained most of its functionality. We have found that in practice this is correlated with the PDI (Protein Dispersibility Index) measured at 20° C. The PDI should be at least 60%. Preferably it is at least 65%, more preferably at least 70%. PDI can be measured according to the method AOCS Ba 10–65 (99) at 20° C.

If the PDI of the individual protein materials to be included in the egg replacer concentrate are known, then the PDI of the protein in the egg replacer composition usually can be estimated by calculating the average based on the amounts of the materials to be included in the composition. Preferably the PDI of each of the protein materials to be included in the composition is at least 50%, more preferably at least 60%.

The material used to provide the soy protein in the composition preferably is soy concentrate or soy isolate, soy isolate being preferred. Such soy protein materials typically have a protein content of about 80 wt % or more. Examples of suitable soy protein materials are Pro Fam 974, Pro Fam 892 and Pro Fam 891, which are available from ADM, Netherlands, and Newpro TS, which is available from Lucas Meyer bv, Netherlands. The soy protein content of the egg replacer concentrate is preferably 25–55 wt %, more preferably 30–50 wt %.

The milk protein in the concentrate is preferably mostly whey protein. More preferably 70–100 wt % of the milk protein is whey protein. Whey protein can be provided in the concentrate by using e.g. whey protein concentrate or isolate powder. For example, whey protein concentrate powder prepared by partial removal of lactose via crystallization and whey protein isolate prepared via ultrafiltration of whey can suitably be used in the preparation of the egg replacer concentrate. Fractionated whey protein, e.g. a beta-lactoglobulin rich fraction, may be used in stead of or in combination with more common milk protein materials. Alternatively, or in combination with a whey protein source, e.g. skim milk powder can be used. Examples of suitable milk protein materials are Proxime WPC35, a whey protein concentrate from Borculodomo, Netherlands, Lacprodan 80 and Lacprodan 70 from Danmark Protein, Denmark, supplied by MD Foods, Netherlands and Ultra Whey 99, a whey protein isolate from Lithos Food BV, Netherlands. The milk protein content of the egg replacer concentrate is preferably 0.5–10 wt %, more preferably 0.5–6 wt %, most preferably 1.0–3.0 wt %.

The milk protein material used to provide the milk protein in the composition can suitably have a protein content of about 30 wt % to about 90 wt %. Such materials usually contain a considerable amount of lactose, e.g. 5–60 wt %. The use of lactose in moderate amounts in the concentrate can help to prevent the viscosity of the liquid egg replacer from becoming too high. If somehow it is preferred not to use lactose or to keep its content low, then a similar contribution to viscosity control can be obtained using other sugars, e.g. glucose, fructose, saccharose or starch hydrolizates with a high dextrose equivalent.

The material used to provide egg white protein in the composition preferably is egg white powder. Egg white powder typically has a protein content of about 75 wt % or more. An example of a suitable egg white powder is dried egg white powder from Nive, Netherlands. Egg white powder may include some carbohydrate. It may for example include about 5% glucose. The amount of egg white protein in the egg replacer concentrate is preferably 5–25 wt %, more preferably 5–20 wt %, most preferably 8–17 wt %.

The protein content of the egg replacer concentrate should be 40–85 wt %. Preferably it is 45–70 wt %, more preferably 52–63 wt %. The weight ratio of soy protein and milk protein in the egg replacer concentrate and in the liquid egg replacer is preferably between 2:1 and 40:1, more preferably between 7:1 and 40:1, most preferably between 10:1 and 30:1. The weight ratio of the egg white protein and the milk protein in the egg replacer concentrate and in the liquid egg replacer is preferably between 2:1 and 10:1, more preferably between 4:1 and 8:1. These preferences apply in particular if the milk protein is largely whey protein, more preferably 70–100 wt %, especially if 100 wt % of the milk protein is whey protein.

The amount and type of proteins has a substantial influence on the rheological properties. The liquid egg replacer should have a relatively low viscosity. If the cook leaves it to stand for a few hours before using it further, e.g. before cooking when making scrambled eggs or omelets during breakfast preparation in a hotel or a hospital, the viscosity should not increase too much and the replacer should not gel to a substantial degree. If the viscosity increases or some gelation takes place upon standing, the structure should be destroyed and the material restored to pourability easily e.g. by whisking with a fork. A low PDI of the protein is likely to cause a high viscosity of the liquid egg replacer, which will increase further upon standing. Typically, higher protein contents result in higher viscosity. Similarly, if milk protein from skimmed milk powder is used, the viscosity will typically be higher than if whey protein is used as the milk protein.

However, the liquid egg replacer should not be too thin either. E.g. upon cooking if scrambled eggs are to be prepared, it should not behave like a thin pan cake batter, because that would adversely affect the resulting end product.

The combination of proteins used also influences the structure development during further preparation of the product to be eaten and the texture of the resulting food product. For example for scrambled eggs or omelets, the firmness of the cooked product is typically higher at higher protein contents and if milk protein including casein, e.g. from skimmed milk powder, is used rather than whey protein. Also the organoleptic properties are influenced by the protein composition. If the egg white protein content is high, the product is more rubbery. The use of soy protein and especially the combination of soy protein and whey protein leads to coagulates with shorter, less elastic texture, i.e. more similar to the texture obtained with whole eggs. Preferably 60–90 wt %, more preferably 70–80 wt % of the protein of the egg replacer concentrate and of the liquid egg replacer is soy protein.

In a preferred embodiment, the egg replacer concentrate comprises 30–50 wt % soy protein, 0.5–10 wt % whey protein and 5–25 wt % egg white protein. In a particularly preferred embodiment the egg replacer concentrate comprises 30–50 wt % soy protein, 1–3 wt % whey protein and 8–17 wt % egg white protein.

The egg replacer concentrate should further include 10–50 wt % vegetable oil. Preferably the oil content is 20–40 wt %, especially 25–35 wt %. Fat or oil from fish or other animal origin is preferably not deliberately included although small amounts of animal fat originating e.g. from the milk protein source can be tolerated. The use of animal fat or oil may cause an increase of the cholesterol content of the product and it may cause off-flavor, depending on the origin of the fat or oil. The vegetable oil used in the egg replacer concentrate preferably is liquid at ambient temperature, although some solids can be tolerated. The solid fat content of the vegetable oil at 35° C. preferably is less than 6 wt %, more preferably it is 0–3 wt %. At 5° C., the solid fat content of the liquid oil is preferably less than 30, more preferably it is 0–10 wt %. Most preferably the solid fat content is 0–2 wt % at 5° C. The solid fat content can suitably be measured as the N-value by means of NMR. Preferred types of vegetable oil are sunflower oil, peanut oil, olive oil, safflower oil, soybean oil, low erucic acid rapeseed oil, corn oil, cottonseed oil, and combinations of two or more thereof. Such oils have low contents of saturated fatty acids. Sunflower oil is particularly preferred in the present composition. Palm oil and fractionated palm olein may be used in stead of the above mentioned oils or in combination with one or more thereof as the vegetable oil in the egg replacer concentrate.

The presence of the vegetable oil in the egg replacer concentrate and the liquid egg replacer influences the rheological properties of the liquid egg replacer and of the final food product ready for consumption. Special measures during the preparation of the egg replacer concentrate or the liquid egg replacer that result in a very fine dispersion of oil droplets in the liquid egg replacer are preferably avoided. A fine oil droplet dispersion may raise the viscosity of the liquid egg replacer and may adversely affect the mouthfeel of the food product to be consumed. In the liquid egg replacer, the volume weighed mean diameter of the oil droplets preferably is 1–50 micron, more preferably 2–30 micron. The volume weighed mean diameter (D4.3) can be measured with a Coulter Counter Multisizer II, Coulter Electronics Ltd, Luton, UK.

The carbohydrate content of the egg replacer concentrate should be 0.5–15 wt %, preferably 1–10 wt %, more preferably 1–7 wt %. Some carbohydrates may be provided by the protein materials used to constitute the concentrate. The milk protein material may include lactose. The soy protein material may include some oligo- and/or polysaccharides. Some carbohydrate may be deliberately included to optimize the texture of the product, e.g. gums or starch. Soluble carbohydrates, especially sugars, can contribute to prevent the liquid egg replacer from being too thick. However, at high sugar content, the viscosity may become too low. A small amount of reducing sugars may contribute to the browning of the product upon frying if it is to be used e.g. for omelets. High amounts of carbohydrates such as starches and gums and other polysaccharides will cause the liquid egg replacer to be too viscous and to become more viscous upon standing before preparation of the final food product. High amounts of carbohydrates may also adversely affect the taste and texture of the final product. The amount of soluble carbohydrates, especially sugars, in the egg replacer concentrate is preferably 0.5–8 wt %, more preferably 1–5 wt %. The amount of oligo- and polysaccharides in the egg replacer concentrate preferably is 0–6 wt %, more preferably 0.1–1 wt %. In particular the amount of thickening polysaccharides, e.g. starches and gums such as xanthan gum and guar gum, in the egg replacer concentrate is preferably less than 1 wt %, more preferably less than 0.5 wt %.

The final food product prepared with the egg replacer composition should have a substantially reduced cholesterol content compared with the corresponding product prepared with egg or egg yolk. The cholesterol content of eggs, expressed on dry matter is typically about 2 wt %. The cholesterol content of the egg replacer concentrate should be less than 0.5 wt %.

Preferably it is less than 0.1 wt %, more preferably less than 0.05 wt %. A low cholesterol content is readily achieved by avoiding the incorporation of materials with high cholesterol contents such as egg yolk powder and milk fat. The present concentrate further may contribute to a diet designed to avoid high blood cholesterol levels by the avoidance of high amounts of saturated fatty acids and by the presence of soy protein.

In a particularly preferred embodiment the liquid egg replacer comprises at least 6.25 g of soy protein per serving. A serving is suitably chosen as 70 g of the liquid egg replacer or less. Preferably it is chosen as 60 g. Expressed with respect to the egg replacer concentrate, a serving can suitably be chosen as about 15 g or 16 g. It is believed that if a serving contains 6.25 g or more of soy protein, such a serving actively lowers the blood cholesterol level. Accordingly it is particularly preferred for the egg replacer concentrate to include at least 41 wt % soy protein, more particularly at least 42 wt % soy protein.

In another preferred embodiment the favourable cholesterol profile of the egg replacer concentrate is further strengthened by the incorporation of phytosterol or -stanol or a combination thereof. It is particular preferred that such sterols and/or stanols are included in the form of esters. Preferably the content of phytosterolesters, -stanolesters or a combination thereof is 10–50 wt % of the amount of vegetable oil in the composition. Suitable esters for use in the present composition and their preparation are described in Prog. Lipid Res. 22, (1983), 161–188, Eur. J. Clin. Nutr. 52, (1998), 334–343 and Eur. J. Clin. Nutr. 54, (2000), 715–725. If sterol and/or stanol esters are included in the present concentrate, their amount should be counted as vegetable oil for the purpose of determining the vegetable oil content of the egg replacer concentrate.

The egg replacer concentrate preferably includes a small amount of emulsifier. A particularly preferred emulsifier is vegetable lecithin, in particular soy lecithin and sunflower lecithin. Commonly available lecithin materials can be used, e.g. materials that contain 30–45 wt % oil and 50–65 wt % phosphatides. The amount of emulsifier preferably is 0.05–4 wt %. More preferably, the egg replacer concentrate includes lecithin in an amount of 0.05–3 wt %, especially 0.1–1 wt %, 0.15–0.3 wt % being particularly preferred. Other emulsifiers may also be used as such or in combination with lecithin. Preferably the emulsifier employed has a HLB value of at least 8. Examples of emulsifiers that may be used in combination with lecithin or instead thereof are lysolecithin, e.g. Max Emul 322 ex Central Soya, Fort Wayne, USA, phosphatidylcholine rich fractions of lecithins, e.g. Leci-Choline ex Lucas Meyer bv, Netherlands, polysorbates, e.g. Tween 60, diacethyl tartaric acid esters, e.g. Admul Datem 1935 ex Quest International, Netherlands, and combinations of two or more thereof. A preferred emulsifier to be used in combination with lecithin is polysorbate Tween 60. It is preferably used in an amount up to 0.5 wt %, in particular 0.1–0.3 wt %. The emulsifier contributes to the ease of preparation of the liquid egg replacer and its stability. Lecithin facilitates in particular also obtaining the desirable thickness of the liquid egg replacer. At lower lecithin content, the liquid egg replacer becomes thicker. However, high emulsifier contents may adversely affect the taste and mouthfeel of the final food product.

The egg replacer concentrate may include additional minor components such as colorants, flavor formulations, seasoning, salt, food acids, preservatives and the like. The combined amount of minor components, other than those mentioned above like emulsifiers and carbohydrates, preferably does not exceed 5 wt %, more preferably it is 0.3–3 wt %, especially 0.5–2 wt %. For example, materials such as glycin, vitamin C and tocopherols may improve the oxidative stability of the concentrate and they may beneficially be included in small quantities.

The egg replacer concentrate can easily be prepared. Any powder materials to be included in the egg replacer concentrate can be dry mixed. Oily materials, e.g. lecithin and sterolesters if used, can be dispersed in the vegetable oil. If the vegetable oil to be used contains solids at the ambient temperature, it is suitably heated to melt it. The oil phase thus obtained can be sprayed onto the powder mix. Mixing is continued until a good distribution of the oil is obtained. The resulting concentrate can be a powder or a paste, depending on the amounts and types of materials used.

A mixture of materials to constitute the egg replacer concentrate may beneficially be treated by passage through a roller mill. Such treatment decreases the particle size of the protein powders and increases the surface binding of oil. It may facilitate the subsequent preparation of the liquid egg replacer.

To obtain good storage stability of the egg replacer concentrate it is preferably ensured that the moisture content of the concentrate does not exceed 7 wt %. More preferably the moisture content is less than 5 wt %. This can readily be achieved by choosing materials to be included in the concentrate that have a sufficiently low moisture content and adequate packaging materials and storage conditions of the raw materials before production and of the prepared concentrate after it has been produced. Most of the moisture in the concentrate is likely to originate from the protein materials used. Preferably the protein materials chosen for the present concentrate have a moisture content of less than 9 wt %, especially less than 7 wt %. By an appropriate choice of raw materials and hygienic working practices it can readily be ensured that the concentrate has good microbiological properties and notably is free from salmonella contamination.

The liquid egg replacer can readily be prepared by mixing the egg replacer concentrate, water and optionally egg white in the ratios described above, e.g. in a food processor or with a hand mixer as are commonly available in kitchens or with another mixing device that is available at the place of the preparation. For production at an industrial facility the concentrate, and optionally egg whites, can be dispersed in water to provide the liquid egg replacer using e.g. a stirred tank or a colloid mill. The liquid egg replacer thus obtained can be used in stead of whole eggs following the recipe of choice for the preparation of the final food product. E.g. it can be used as such or with some added seasoning to prepare a fried egg alternative. Milk and seasoning can be included to prepare scrambled eggs or omelets. For e.g. omelets, fried mushrooms or pieces of ham or grated cheese can be included. The liquid egg replacer can be used as such in stead of eggs e.g. to prepare a mayonnaise-like dressing. It may also be used to prepare baked products e.g. cakes, muffins and the like.

The optimal amount of water to be used with the egg replacer concentrate and optionally the egg white, depends to some degree on the precise composition of the egg replacer concentrate as described above. This can readily be determined by first using a relatively low amount of water. If the liquid egg replacer is then still thicker than desired, somewhat more water can be mixed in.

The viscosity of the liquid egg replacer preferably is 300–20000 mPas, more preferably 400–8000 mPas, especially 500–5000 mPas at 20° C. and 0.15 $s^{-1}$. The viscosity of the liquid egg replacer preferably stays within these limits for a period of at least 1 hour, more preferably at least 2 hours after preparation of the liquid egg replacer from the egg replacer composition if kept at a temperature of 20° C. To obtain reproducible measurements on viscosity, the incorporation of air in the liquid egg replacer should preferably be avoided. Therefore, in such case, the liquid egg replacer can suitably be prepared from the egg replacer concentrate, water and optionally egg whites, using a vacuum mixer, e.g. a Stephan mixer during 5 minutes at 900 rpm, using its vacuum function. The viscosity can suitably be measured using a Brookfield viscometer (model DV-II+) using the T-D spindle at 10 rpm.

The pH of the liquid egg replacer preferably is 6.0–7.5, more preferably it is 6.2–7.0, most preferably it is 6.4–6.8. At high pH, the viscosity of the liquid egg replacer becomes too high. A somewhat lower pH can be beneficial also because it raises the temperature at which the proteins coagulate e.g. when preparing scrambled eggs, and brings it closer to the temperature at which coagulation occurs if eggs are used. A too low pH may however cause denaturation of the proteins, which is preferably avoided. Depending on the composition of the egg replacer concentrate, the pH of the liquid egg replacer prepared therefrom can be adapted if so desired by including small amounts of acidic or alkaline components in the egg replacer concentrate. To lower the pH e.g. food acids such as lactic, phosphoric, citric, ascorbic or fumaric acid or a combination of 2 or more of such acids can be used. The pH can be raised e.g. with trisodium phosphate, disodium orthophosphate, sodium carbonate or bicarbonate and or another food grade alkaline agent. However, it is preferred that the pH is below 7 and the use of such alkaline materials is preferably avoided.

Throughout this specification all parts, percentages and ratios are by weight unless otherwise indicated. Except in the operating and comparative examples, or where otherwise explicitly indicated, all numbers in this description indicating amounts of material ought to be understood as modified by the word "about".

The term "comprising" is meant not to be limiting to any subsequently stated elements but rather to encompass non-specified elements of major or minor functional importance. In other words the listed steps, elements or options need not be exhaustive. Whenever the words "including" or "having" are used, these terms are meant to be equivalent to "comprising" as defined above.

EXAMPLE 1

An egg replacer composition was prepared from the ingredients listed in Table 1.

TABLE 1

| Phase | Ingredient | Amount (pbw) |
|---|---|---|
| Oil phase | Sunflower oil | 7.56 |
| | Polysorbate Tween 60 | 0.04 |
| | Lecithin (Bolec ZT) | 0.04 |
| | Tocopherol mix (70% tph) | 0.002 |
| | Colourant | p.m. |
| Aqueous phase | Soy protein isolate(Pro Fam 974) | 9.15 |
| | Egg white powder | 3.63 |
| | Whey protein concentrate | 1.38 |
| | Xanthan gum | 0.026 |
| | Citric acid | 0.005 |
| | Ascorbic acid | 0.008 |
| | Glycin | 0.005 |
| | Salt | 0.15 |
| | Flavour | p.m. |

Tween 60 was obtained from Quest International, Netherlands. Bolec ZT is a transparant soybean lecithin paste with a phospatide content of 63.5 wt % from Unimills, Netherlands. Pro Fam 974 is a soy protein isolate (protein content 90 wt %, PDI 75% at 20° C.) from ADM, Netherlands. The egg white powder used was dried egg white powder, non whippable from Nive, Netherlands (protein content 81 wt %, PDI 100%). The whey protein concentrate was Proxime WPC35 from Borculodomo, Netherlands (protein content 35 wt %, PDI 100%).

The ingredients of each of the phases were mixed and the two mixtures were then combined and mixed for 5 minutes in a Hobart mixer. The resulting egg replacer concentrate was a dry paste.

The resulting egg replacer concentrate had a moisture content of 5 wt %. It had a carbohydrate content of 6 wt % and a protein content of 53 wt %. The cholesterol content was less than 0.001 wt %. The PDI was about 82%.

22 pbw of the egg replacer concentrate were mixed with 78 pbw of water in a Stephan mixer at 900 rpm. The liquid egg replacer had a viscosity of about 600 mPas at 0.15 s$^{-1}$ and 20° C. The viscosity had hardly increased after 24 hour storage. The liquid was used to prepare omelets in a usual manner. For preparing the omelets about 60 g of liquid egg replacer was used, which was poured in a preheated pan that contained about 3 ml of oil. Good omelets were obtained.

EXAMPLE 2

Example 1 was repeated except that 11.333 pbw of the soy protein isolate, 1.557 pbw of the whey protein concentrate and 7.2 pbw of the sunflower oil were used to prepare the egg replacer concentrate. The resulting liquid egg replacer contained 6.25 g soy protein per 60 g serving. The viscosity was about 2800 mPas at 0.15 s$^{-1}$ and 20° C. After 24 hours it had increased to about 4000 mPas. The viscosity was judged to be somewhat higher than optimal. The resulting omelet was also not as good as that of Example 1 but still very acceptable.

EXAMPLES 3 AND 4

Examples 1 and 2 were repeated except that no polysorbate was used and that the amount of oil was adapted to 7.6 pbw and 7.24 pbw, respectively. Good results, similar to those of examples 1 and 2 were obtained. Samples of the omelets were kept overnight together with a reference sample of omelet prepared from real eggs. The next day the sample of omelet from real egg had become very tough and unpleasant to eat. The samples of examples 3 and 4 had retained their texture and mouthfeel much better.

COMPARATIVE EXAMPLES A AND B

Example 1 was repeated except that for example A, 5.01 pbw whey protein concentrate was used and no egg white powder. For example B, 5.01 pbw egg white powder was used and no whey protein concentrate. The viscosity of each of the liquid egg replacers was acceptable, although the composition of example B showed more than doubling of the viscosity during 24 hours storage. The composition of example A remained liquid during the attempted preparation of the omelet. The composition of example B did coagulate during the cooking but the texture was very crumbly, resembling scrambled eggs rather than omelets. The mouthfeel was rather rubbery. No browning had occurred during the attempted preparation of the omelet.

COMPARATIVE EXAMPLE C 4 pbw of the egg replacer concentrate of example 1 was mixed with 1 pbw of maltodextrin (Paselli MD20 from Avebe, Netherlands) in a Hobart mixer. The resulting egg replacer concentrate had a carbohydrate content of 25 wt %. The liquid egg replacer was prepared by mixing 22 pbw of the egg replacer concentrate with 78 pbw of water in a Stephan mixer as before. The viscosity of the resulting liquid egg replacer was rather low at 200 mPas at 0.15 s$^{-1}$ and 20° C. Upon storage during 24 hours, the viscosity increased by a factor of 5 to about 1000 mPas. In attempting to prepare the omelets, the composition did not gel properly. It did not give an egg-like structure and it had a caramel-like appearance.

EXAMPLE 5

Example 1 was repeated except that for the egg replacer concentrate the amounts of table 2 were used.

TABLE 2

| Phase | Ingredient | Amount (pbw) |
|---|---|---|
| Oil phase | Sunflower oil | 10.449 |
| | Polysorbate Tween 60 | 0.054 |
| | Lecithin (Bolec ZT) | 0.054 |
| | Colorant (30% carotene in oil) | 0.0062 |
| | Tocopherol mix (70% tph) | 0.003 |

TABLE 2-continued

| Phase | Ingredient | Amount (pbw) |
|---|---|---|
| Aqueous phase | Soy protein isolate (Pro Fam 974) | 10.6 |
| | Egg white powder | 3.6 |
| | Whey protein concentrate | 1.8 |
| | Xanthan gum | 0.03 |
| | Citric acid | 0.006 |
| | Ascorbic acid | 0.009 |
| | Glycin | 0.006 |
| | Salt | 0.15 |
| | Flavour | p.m. |

To prepare the liquid egg replacer, 1 pbw of the egg replacer concentrate was mixed with 3 pbw of water. The viscosity of the liquid egg replacer was somewhat high but otherwise good results were obtained.

EXAMPLE 6

Example 5 was repeated except that in stead of whey protein concentrate, skimmed milk powder (protein content 36 wt %, PDI 95%). The resulting egg replacer concentrate had a carbohydrate content of about 7 wt %. The liquid egg replacer had a somewhat higher viscosity than the product of example 3, but overall the product was judged to be acceptable.

EXAMPLES 7–9 AND COMPARATIVE EXAMPLE D

An oil phase composition was prepared from the following materials:

| | |
|---|---|
| Sunflower oil | 98.98 pbw |
| Lecithin (Bolec ZT) | 0.57 pbw |
| Colourant (3% carotene) | 0.42 pbw |
| Tocopherol mix | 0.03 pbw |

A powder phase composition was prepared from the following materials:

| | |
|---|---|
| Soy protein isolate (Pro Fam 974) | 67.8 pbw |
| Egg white powder | 21.7 pbw |
| Whey protein concentrate | 9.3 pbw |
| Xanthan gum | 0.16 pbw |
| Citric acid | 0.03 pbw |
| Ascorbic acid | 0.05 pbw |
| Glycin | 0.03 pbw |
| Salt | 0.90 pbw |

The materials used were the same as described for example 1. Egg replacer concentrates were prepared from the oil phase composition and the powder phase composition as described in example 1, using the relative amounts as shown in Table 3. The resulting egg replacer concentrates were used to prepare liquid egg replacers as described in example 1 using the relative amounts of water shown in Table 3.

Table 3 also shows the oil content of the egg replacer concentrates. The amount and composition of the protein was constant for the 4 resulting liquid egg replacers.

TABLE 3

| | Ex. 7 | Ex. 8 | Ex. 9 | Comp. Ex. D |
|---|---|---|---|---|
| Oil phase composition | 6 pbw | 4 pbw | 2 pbw | 1 pbw |
| Powder phase composition | 14 pbw | 14 pbw | 14 pbw | 14 pbw |
| Water | 80 pbw | 82 pbw | 84 pbw | 85 pbw |
| Oil content in egg replacer concentrate | 30 wt % | 22.3 wt % | 12.6 wt % | 6.7 wt % |

Omelets were prepared from the liquid egg replacers. The omelet of example 9 and especially of comparative example D stuck to the pan and their texture and mouthfeel were not good. The omelet of example D was unacceptable, that of example 9 only borderline acceptable. The omelets of examples 7 and 8 were much better, that of example 7 being considered the better one.

COMPARATIVE EXAMPLE E

An egg replacer concentrate was prepard from the following materials:

| | |
|---|---|
| Sunflower oil | 2.13 pbw |
| Lecithin | 0.03 pbw |
| Colourant | 0.02 pbw |
| Soy flour | 15.41 pbw |
| Egg white powder | 2.85 pbw |
| Whey protein concentrate | 1.22 pbw |
| Xanthan gum | 0.02 pbw |
| Ascorbic acid | 0.01 pbw |
| Salt | 0.12 pbw |
| Egg flavor | 0.18 pbw |

The soy flour used was defatted soy flour 200/70—Cargill, ex Cargill, Minneapolis, USA. It contained 9% moisture, and expressed on dry matter, 52 wt % protein, 46 wt % carbohydrates (including 17 wt % fibres, expressed on the dry matter of the soy flour), 1 wt % fat and 1 wt % minerals. Otherwise the materials and processes used were the same as in example 1. The carbohydrate content of the egg replacer concentrate exceeded 20 wt %.

An attempt was made to prepare an omelet with this composition but the results were unacceptable. The composition stuck badly to the pan, the texture was dough/bread like and the taste was very poor.

We claim:

1. An egg replacer concentrate that comprises 40–85 wt % protein, 10–50 wt % vegetable oil, 0.5–15 wt % carbohydrate and less than 0.5 wt % cholesterol, wherein the protein comprises soy protein, milk protein and egg white protein, at least 50 wt % of the protein is soy protein and wherein the PDI is at least 60%.

2. A concentrate according to claim 1 wherein the weight ratio of soy protein and milk protein is between 2:1 and 40:1.

3. A concentrate according to claim 2 wherein the weight ratio of soy protein and milk protein is between 7:1 and 40:1.

4. A concentrate according to claim 1 wherein the weight ratio of egg white protein and milk protein is between 2:1 and 10:1.

5. A concentrate according to claim 1 wherein the milk protein is whey protein.

6. A concentrate according to claim 1 wherein 60–90 wt % of the protein of the concentrate is soy protein.

7. A concentrate according to claim 1 that comprises 30–50 wt % soy protein, 0.5–10 wt % whey protein and 5–25 wt % egg white protein.

8. A concentrate according to claim 7 that comprises 1–3 wt % whey protein and 8–17 wt % egg white protein.

9. A concentrate according to claim 1 that comprises at least 41 wt % soy protein.

10. A concentrate according to claim 1 that comprises 0.05–4 wt % emulsifier.

11. A concentrate according to claim 1 wherein the vegetable oil content is 20–40 wt %.

12. A concentrate according to claim 1 wherein the carbohydrate content is 1–10 wt %.

13. A liquid egg replacer that comprises 16–28 wt % of an egg replacer concentrate according to claim 1, 45–82 wt % water, wherein the moisture content of the liquid egg replacer is 75–84 wt %.

14. An egg replacer according to claim 13 wherein the liquid egg replacer comprises 70–82 wt % water and 18–30 wt % of the egg replacer concentrate.

15. An egg replacer according to claim 13 that has a viscosity of 300–20000 mPas at 0.15 s−1 and 20° C.

16. An egg replacer concentrate that comprises 40–85 wt % protein, 10–50 wt % vegetable oil, 0.5–15 wt % carbohydrate and less than 0.5 wt % cholesterol, wherein the protein comprises soy protein and milk protein, at least 50 wt % of the protein is soy protein and wherein the PDI is at least 60%.

17. A concentrate according to claim 16 wherein the weight ratio of soy protein and milk protein is between 2:1 and 40:1.

18. A concentrate according to claim 17 wherein the weight ratio of soy protein and milk protein is between 7:1 and 40:1.

19. A concentrate according to claim 16 wherein the milk protein is whey protein.

20. A concentrate according to claim 16 wherein 60–90 wt % of the protein is soy protein.

21. A concentrate according to claim 16 that comprises at least 41 wt % soy protein.

22. A concentrate according to claim 16 that comprises 0.05–4 wt % emulsifier.

23. A concentrate according to claim 16 wherein the vegetable oil content is 20–40 wt %.

24. A concentrate according to claim 16 wherein the carbohydrate content is 1–10 wt %.

25. A liquid egg replacer that comprises 16–28 wt % of an egg replacer concentrate according to claim 16, at least 45 wt % water and 20–40 wt % egg white, wherein the moisture content of the liquid egg replacer is 75–84 wt %.

26. Liquid egg replacer according to claim 25 that has a viscosity of 300–20000 mPas at 0.15 s−1 and 20° C.

* * * * *